United States Patent [19]
Holst et al.

[11] Patent Number: 5,635,139
[45] Date of Patent: Jun. 3, 1997

[54] METHOD AND APPARATUS FOR DESTRUCTION OF VOLATILE ORGANIC COMPOUND FLOWS OF VARYING CONCENTRATION

[75] Inventors: Mark Holst, Concord; Richard J. Martin, San Jose, both of Calif.

[73] Assignee: Thermatrix, Inc., San Jose, Calif.

[21] Appl. No.: 527,545

[22] Filed: Sep. 13, 1995

Related U.S. Application Data

[62] Division of Ser. No. 347,870, Dec. 1, 1994.

[51] Int. Cl.$^6$ .................. G05D 9/00; B01D 50/00; B01J 8/08
[52] U.S. Cl. .................. 422/108; 422/122; 422/125; 422/180; 422/191; 422/216; 422/236; 431/7; 431/170; 122/4 D
[58] Field of Search .................. 422/108, 122, 422/125, 170, 177, 180, 191, 211, 216, 235, 236, 4 D; 431/7, 170; 423/245.3

[56] References Cited

U.S. PATENT DOCUMENTS

| | | | |
|---|---|---|---|
| 2,537,091 | 1/1951 | Rodman et al. | 158/115 |
| 2,610,411 | 9/1952 | Steese | 34/35 |
| 2,656,008 | 10/1953 | Engel | 183/6 |
| 3,251,656 | 5/1966 | Edward | 23/277 |
| 3,706,445 | 12/1972 | Gentry | 263/8 |
| 3,999,936 | 12/1976 | Hasselman | 431/202 |
| 4,058,147 | 11/1977 | Stary et al. | 141/45 |
| 4,134,271 | 1/1979 | Datis | 62/54 |
| 4,176,162 | 11/1979 | Stern | 423/210 |
| 4,368,029 | 1/1983 | Lacroix | 431/7 |
| 4,688,495 | 8/1987 | Galloway | 110/250 |
| 4,722,662 | 2/1988 | Morgan | 415/168 |
| 4,746,290 | 5/1988 | DeCicco et al. | 432/19 |
| 4,766,822 | 8/1988 | DeCicco et al. | 110/212 |
| 4,815,398 | 3/1989 | Keating, II et al. | 110/233 |
| 4,823,710 | 4/1989 | Kroneberger et al. | 110/236 |
| 4,907,965 | 3/1990 | Howarth et al. | 431/202 |
| 4,925,389 | 5/1990 | DeCicco et al. | 432/106 |
| 4,951,743 | 8/1990 | Henderson | 166/84 |
| 4,961,391 | 10/1990 | Mak et al. | 110/346 |
| 4,974,528 | 12/1990 | Barcell | 110/240 |
| 4,983,364 | 1/1991 | Buck et al. | 422/189 |
| 5,050,603 | 9/1991 | Stokes et al. | 123/523 |
| 5,098,481 | 3/1992 | Monlux | 134/19 |
| 5,165,884 | 11/1992 | Martin et al. | 431/7 |
| 5,203,370 | 4/1993 | Block et al. | 137/312 |
| 5,215,075 | 6/1993 | Caridis et al. | 126/300 |
| 5,228,803 | 7/1993 | Crosby et al. | 405/128 |
| 5,277,545 | 1/1994 | De Lange | 415/168.1 |
| 5,282,695 | 2/1994 | Crosby et al. | 405/128 |
| 5,291,859 | 3/1994 | Brink et al. | 122/7 R |
| 5,295,448 | 3/1994 | Vickery | 110/214 |
| 5,320,518 | 6/1994 | Stilger et al. | 431/7 |
| 5,344,313 | 9/1994 | Johnsen, Jr. | 431/346 |
| 5,414,201 | 5/1995 | Greene | 588/206 |
| 5,415,682 | 5/1995 | Zarchy et al. | 95/101 |
| 5,427,746 | 6/1995 | Pereira et al. | 422/177 |
| 5,516,499 | 5/1996 | Pereira et al. | 423/245.3 |

*Primary Examiner*—Nina Bhat
*Attorney, Agent, or Firm*—Woodcock Washburn Kurtz Mackiewicz & Norris

[57] ABSTRACT

Apparatuses for treating gas streams containing variations in VOC concentration whereby the VOC's are destroyed in a combination non-catalytic/catalytic oxidation system are disclosed. A non-catalytic destruction matrix composed of inert ceramic materials that enhance process mixing and provide thermal inertia for process stability is used when VOC concentrations are high and a catalytic oxidizer is principally used when VOC concentrations are low. The exhaust from the non-catalytic destruction matrix is passed through the catalytic oxidizer to maintain proper catalytic oxidizer operating temperatures. Supplemental fuel and air are added as appropriate upstream or downstream of the non-catalytic oxidizer to maintain proper heat values in each portion of the system.

24 Claims, 2 Drawing Sheets

METHOD AND APPARATUS FOR DESTRUCTION OF VOLATILE ORGANIC COMPOUND FLOWS OF VARYING CONCENTRATION

This is division, of application Ser. No. 08/347,870, filed Dec. 10, 1991 now allowed U.S. Patent pending disclosure of which is herein incorporated by reference.

FIELD OF THE INVENTION

The field of the present invention is methods and apparatuses for cleaning up gas streams contaminated with volatile organic compounds ("VOC's"). In particular, the present invention relates to apparatuses and methods for controlled exothermic reaction of VOC's from soil vapor extraction systems, soil remediation systems, or other sources of organic vapors having concentrations that vary over time, although it will be appreciated that the invention in its broader application can be applied to any commercial process giving off VOC's.

BACKGROUND OF THE INVENTION

There are many different sources of VOC's that have fume concentrations that vary over time. For example, certain manufacturing batch processes will have VOC's fume flows that will vary from rich to lean over an extended period (such as every 24 hours).

In addition, soils and sludges contaminated with organic chemicals are a widespread problem throughout the world, with millions of cubic meters requiring remediation in the United States alone. For example, concentrated underground organic contaminant plumes are one of the most prevalent ground water contamination sources. A typical source of concentrated plume is a leaking underground storage tank. When the stored liquid escapes from the tank slowly, it can take years for the operator to become aware of the problem. By that time, the solvent or fuel can percolate deep into the earth, often into water-bearing regions. Collecting as a separate, liquid organic phase called Non-Aqueous-Phase Liquids ("NAPL's"), these contaminants provide a source that continuously compromises surrounding ground water. This type of spill is one of the most difficult environmental problems to remediate.

Clean-up of such contaminated materials is also subject to a wide variety of regulations in the United States, including those covered under The Comprehensive Environmental Response, Compensation, and Liability Act of 1980 ("CERCLA"), The Superfund Amendments and Reauthorization Act of 1986 ("SARA"), and The Resource Conservation and Recovery Act ("RCRA"). The total cost of these clean-up efforts in the United States has been estimated to exceed $200 billion over the next 30 to 40 years.

A number of processes can be used to deal with these problems of contaminated soils and sludges. Early techniques involved simply excavating the contaminated soil and disposing of it at a facility approved for the acceptance of hazardous waste. This method has high direct costs, and can lead to serious disruption of business operations for extended periods of time.

Attempts to remove such material by pumping the ground water required that huge amounts of water be washed through the system, requiring tens of years. Pumping at some sites for many years has resulted in effluent water that was apparently clean, but when the pumps were shut off and restarted several years later, the ground water again contained contaminates because they were not fully remediated in the first place.

Processes such as thermal desorption and in-situ soil vapor extraction ("SVE") allow for the controlled separation of organics from solids and soils. In these processes, the organic material is volatilized to produce an organic vapor, which thereafter must be removed or otherwise treated. This is in contrast to direct incineration, which involves heating solid material to destruction temperatures in an oxidizing environment where volatilization and combustion of organics takes place simultaneously.

Soil Vapor Extraction

SVE is one current method for removing contaminants in situ. The SVE process is a technique for the removal of VOC's, and some semivolatile organic compounds ("SVOC's"), from the vadose zone. The vadose zone is the subsurface soil zone located between the land surface and the top of the water table. SVE creates a deliberate movement of air (or steam) through the soil by forcing a vacuum in a soil region, causing the organic compounds to vaporize and be removed with air through a system of wells to a vacuum system on the surface. The SVE approach is most suited to use after any free product or liquid has been recovered by conventional pumping techniques to remove occluded liquid remaining in the interstices of the soil particles.

In efforts to improve the efficiency of SVE remediation, supplemental techniques have recently been applied to standard SVE systems that include air sparging and steam injection. Air sparging allows for the recovery of the less volatile organics and dissolved contaminants and residuals beneath the water table by injection of heated air below the groundwater surface. The injected air enhances volatilization by increasing the water-to-air surface area and heating of the soil matrix. In some cases it may induce upward migration of globules of product with migrating air bubbles.

Steam injection injects steam into the contaminated zone to increase the subsurface temperatures, thereby volatilizing organic compounds with high boiling points. The added heat provided by the steam enhances the volatilization of organic residuals that are in the soil. The steam front mobilizes the heavy residuals and volatilizes the light fractions. Enhanced volatilization and residuals migration effects a faster, more complete mass transfer process that speeds the remediation and reduces cleanup costs.

SVE, whether or not combined with air sparging or steam injection techniques, must be used with other technologies in a treatment train since it transfers contaminants from soil and interstitial water to air and the entrained and condensed water waste streams—streams that require further treatment. Treatment of the contaminated air in typical SVE processes today includes either adsorption using activated carbon, condensation, or oxidation of the VOC's, catalytically or by incineration. Other methods, such as biological treatment, ultraviolet oxidation, and dispersion have also been used.

Carbon adsorption is the most commonly employed vapor treatment process and is adaptable to a wide range of VOC concentrations and flow rates. Skid-mounted, off-site-regenerated, carbon-canister systems are generally employed for low gas volumes and onsite-regenerated bed systems are employed for high gas volumes and cleanups of extended duration. Adsorption on granular activated carbon, however, is often unsuitable when the quantity of the contaminant is large, or the VOC's are not readily adsorbed because such situations lead to rapid saturation of the carbon. Furthermore, such systems only act to concentrate the vapors onto a solid bed that must be periodically backflushed to rejuvenate the carbon. Such backflushing raises the issue of contaminant disposal all over again.

Condensation can be used to separate the effluent VOC's from the carrier air. This is usually accomplished by refrigeration. The efficiency of this technique is determined by the effect of temperature on the vapor pressure of the VOC's present. Condensation is most efficient for high concentrations of vapors. The technology becomes less efficient as the clean up progresses and vapor concentrations drop. It may be ineffective during the last stages of the clean up. Since vapors are not completely condensed, a carbon adsorption or other additional treatment step may be required to remove residual vapors from the effluent stream.

Thermal destruction of contaminant vapors by incineration or catalytic oxidation can be effective for a wide range of compounds.

Catalytic oxidation is effective on hydrocarbon vapors. Recently-developed catalysts also permit the efficient destruction of halogenated compounds (bromides, chlorides, or fluorides). Nevertheless, although catalytic combustion or oxidation may be the preferred process, its use is constrained within certain limits. For example, if the concentration of the VOC's from a contaminant such as gasoline exceeds 25% of the lower explosive limit ("LEL"), the heat given off during oxidation raises the temperature of the catalytic oxidizer to a point of thermal deactivation of the catalyst. While such problems can, to a certain extent, be controlled by using dilution air ahead of the catalytic combustor, this means of temperature control is not practical at the high VOC concentrations often encountered during the early phase of a vapor extraction process.

Conventional flame-based combustion technologies, however, offer only adequate destruction efficiencies while generating secondary pollutants such as $NO_x$. Other thermal oxidation systems, particularly those employing catalysts, have demonstrated that effectiveness is greatly diminished at elevated chlorinated hydrocarbon concentrations. Catalysis exhibits problems at chlorinated hydrocarbon concentrations of as low as 100 ppm.

Flame-based destruction processes also pose serious performance, regulatory, and public acceptance issues. Incineration is difficult to control and can result in the formation of highly undesirable by-products such as dioxins, furans, and oxides of nitrogen.

For example, standard combustors are particularly undesirable when dealing with chlorinated hydrocarbons. A free flame also results in incomplete combustion in some instances, and in uncontrollable production of undesirable side products. Because combustors typically operate at flame temperatures on the order of 3500° F., significant amounts of unwanted $NO_x$ are often produced. Nitrous oxide ($N_2O$) and ammonia ($NH_3$) are often by-products of $NO_x$ removal techniques. The high temperatures also raise significant safety issues.

Using current technologies, additional forms of contaminated residuals are typically produced from the application of SVE. These may include recovered condensate (contaminated water and possibly supernatant organics), spent activated carbon from off-gas treatment, nonrecovered contaminant in the soil, soil tailings from drilling, and air emissions after treatment. Each of these raise their own problems of disposal.

To date, the type of treatment chosen has generally depended on the composition and concentration of contaminants. For example, in cases where the concentration and/or the boiling point of the VOC's are low, condensation is economically impractical as compared to the capital and operating costs of adsorption or oxidation. The problem is that in many VOC abatement situations, the concentration of VOC's will vary over time. This is of particular concern in SVE, where a site may begin with a very high VOC concentration that, over several months of remediation, will drop off to a very low VOC concentration. For high VOC loadings, thermal oxidizers are typically preferred due to their ability to withstand high temperatures, and their low operating cost and high destruction rate. For low VOC loadings, catalytic oxidizers are typically preferred due to their lower operating temperature, which requires very little supplemental fuel addition. Conversely, when a thermal oxidizer is operated on low VOC fumes, high fuel consumption is required to maintain the high temperatures required by the oxidizer. When a catalytic oxidizer is operated on high VOC fumes, potential catalyst sintering and deactivation can result due to excessive temperatures.

Attempts have been made to overcome this operating cost/burnout scenerio by creating systems that utilize both a thermal oxidizer and a catalytic oxidizer, but such systems invariably have the two oxidizers as separate entities with some sort of switching mechanism for switching from one unit to another depending upon VOC concentration. One example of such a dual system is shown in U.S. Pat. No. 4,983,364 (Buck et al.). The very nature of such a dual, segregated system results in high capital costs.

Furthermore, while oxidation catalysts can be said to operate in a flameless, low $NO_x$ fashion, under most circumstances a pilot flame is used in a catalytic oxidizer in order to maintain catalyst temperature at an optimum level. In part, this is due to the fact that the normally available supplemental fuels, such as natural gas and propane, consist of low carbon species that will not readily oxidize in most catalysts. Additionally, because of the typically high cost of the catalyst itself, most catalytic beds are quite small and the possibility of a fume concentration variation disrupting the steady state nature of any catalytic bed operated without the use of a supplemental pilot flame weighs in favor of using a pilot flame. Consequently, temperature control of the catalyst is achieved using direct flow-through of hot combustion off-gases from an upstream pilot flame. The problem with this method, however, is that, while the catalytic oxidation itself is inherently a low $NO_x$ process, the diffusion pilot flame puts significant levels of $NO_x$ into the catalytic oxidizer exhaust gas.

Thermal Desorption

Thermal desorption has been successfully demonstrated for the treatment of soils and solids contaminated by organic compounds. Treatment of soils contaminated with organic compounds, dioxin, polynuclear aromatic hydrocarbons (PAHs), polychlorinated biphenyls (PCBs), and low level mixed wastes using thermal desorption is known. Recognizing the cost-competitive nature of thermal desorption, many remediation companies have diversified their capabilities to include thermal desorber processes. Others are converting existing fluidized bed incinerators to thermal desorbers emphasizing thermal desorption as the preferred thermal treatment process. In addition, thermal desorption has proven to be an effective method in remediating mixed wastes or soils contaminated with both radioactive compounds and organics.

With thermal desorption, the process removes organic contaminants by indirectly heating the soils and solids to temperatures sufficient to vaporize the hazardous components. The soil is typically heated to no higher than 550° C., and frequently the heating occurs in the absence of oxygen.

The thermal desorber, acting as a separator, removes the organic contamination, leaving a residue that contains inerts, radioactive material (when present), and metals in the soil. Once the treated soil has been stabilized to prevent any metal salts in the soil from dissolving in water, the stabilized material can be characterized and disposed of or handled as a low-level radioactive waste.

After volatilization, the organic vapors in the off-gas are presently typically treated by either oxidation in a high temperature combustion chamber/incinerator or by condensation and conventional treatment of the small amount of resultant condensate such as by capturing on a carbon substrate. Examples of known systems for thermal desorption that use a following combustion technique include those described in U.S. Pat. No. 5,282,695 (Crosby et al.), U.S. Pat. No. 5,228,803 (Crosby et al.), U.S. Pat. No. 4,974,528 (Barcell), U.S. Pat. No. 4,961,391 (Mak et al.), U.S. Pat No. 4,925,389 (DeCicco et al.), U.S. Pat. No. 4,815,398 (Keating et al.), U.S. Pat. No. 4,766,822 (DeCicco et al.), and U.S. Pat No. 4,746,290 (DeCicco et al.). Examples of known systems for thermal desorption that use a following condensation technique include those described. in U.S. Pat. No. 5,098,481 (Monlux), and U.S. Pat. No. 5,228,803 (Crosby et al.).

Thermal desorption techniques have problems, however, particularly in the need for further processing after the contaminants are volatilized. Examples of problems that arise when condensation is used for post-volatilization treatment include disposal issues surrounding both the carbon used for adsorption and the recovered liquid organic wastes. As such, the direct destruction of waste organics into benign products; such as water, carbon dioxide, and salts is frequently preferable as a final solution.

The use of destruction technologies in the processing of volatilized contaminants typically involves the thermochemical reformation of the organic compounds into such oxidized products. While this is desirable as a final solution, as discussed previously with respect to SVE, flame-based destruction process can pose serious performance, regulatory, and public acceptance issues.

The difficulties and expense of obtaining operating permits for hazardous waste treatment processes utilizing flame based technologies, either for direct soil incineration or for incineration of volatilized contaminants, is also well known. Alternatively, the encumbrances of dealing with contaminated carbon wastes or off-site liquid waste disposal inherent with the condensing option increases the costs of that type of system and affects operational factors negatively. Furthermore, the relatively low temperatures associated with thermal separation can be the optimum temperature for converting PAHs and chlorinated phenolics into dibenzo furans and dioxins.

Thus, it can be seen that there is a need for a practical means of destroying organics removed from contaminated soils or other sources of variable concentration VOC's that avoids the various difficulties and inefficiencies of the prior art. There is a further need for such a system to result in high destruction and removal efficiency ("DRE") of the organics in a cost-effective manner.

SUMMARY OF THE INVENTION

The present invention is directed to methods and apparatuses for destroying VOC's contained in fume flows by using a combination of a catalytic bed and a porous inert media ("PIM") destruction matrix contained as part of a flameless, non-catalytic oxidizer. The catalytic oxidizer and flameless oxidizer are selectively actuated to accomodate different VOC concentrations during a vapor removal process. Therefore, the present invention is a controlled combination of flameless, non-catalytic oxidation and catalytic oxidation where a flameless, non-catalytic oxidizer is used when the hydrocarbon concentration is relatively high and a catalytic oxidizer is used when the hydrocarbon concentration drops below a predetermined limit. The system can operate efficiently with any VOC concentration in the vapor stream.

The invention provides for life-cycle cost-effectiveness when the VOC content of the fume stream may vary with time, while achieving very low levels of $NO_x$ production. A low temperature catalytic process is used for destruction during periods when the fume flow has low VOC content while the PIM oxidizer is maintained on low flow to maintain a steady temperature within the catalyst bed. The PIM oxidizer is used for principal oxidation during periods when the fume flow has high VOC content.

The combination of the catalytic bed and flameless oxidizer is arranged so that the fume flow can be initially fed to either the flameless oxidizer or directly to the catalytic bed. Supplemental fuel and/or air is used to maintain appropriate temperatures in both the flameless oxidizer and the catalytic bed.

The combination system provides an integrated, energy efficient VOC destruction process offering significant advantages. These advantages include higher contamination removal efficiencies, "near zero" emissions, and reduced costs.

The destruction matrix of the flameless oxidizer is composed of inert ceramic materials that enhance process mixing and provide thermal inertia for process stability. Such a destruction matrix is designed to produce DRE's of greater than 99.99%, with less than 10 ppmV CO and less than 2 ppmV $NO_x$. The thermal oxidizer/destruction matrix is designed to operate in a flameless manner at temperatures of 1550°–1800° F., below the normal flammability limits of the volatiles to be destroyed.

The appropriate conversion may be obtained at lower temperatures and residence times than those required in a conventional incinerator while still handling a full range of VOC concentrations. There is also inherent safety in the use of a process in which there are no open flames (other than, perhaps, in the preheater), and in which the mixture of gases to be introduced into the matrix is relatively cool, outside the flammability limits of the constituents, and, therefore, not explosive under ambient conditions. Problems of flameouts are avoided. Moreover, from a practical viewpoint, all of these features should result in the ability to obtain required government permitting more easily.

Accordingly, it is an object of the present invention to provide a multi-stage oxidation system in which efficiency is optimized while minimizing costs for final disposal of VOC contaminants.

It is a further object of the present invention to provide methods and apparatuses capable of meeting existing regulations for the destruction of organic contaminants contained within soils or other sources of VOC's that vary in concentration over time.

It is another object of the present invention to provide methods and apparatuses for destruction of organic contaminants removed from soils or other sources of VOC's that vary in concentration over time while minimizing $NO_x$ oxidation by-products to levels below those achievable by conventional technologies.

Other and further objects and advantages will appear hereinafter.

DETAILED DESCRIPTION OF THE PREFERRED EMBODIMENTS

Figure 1:
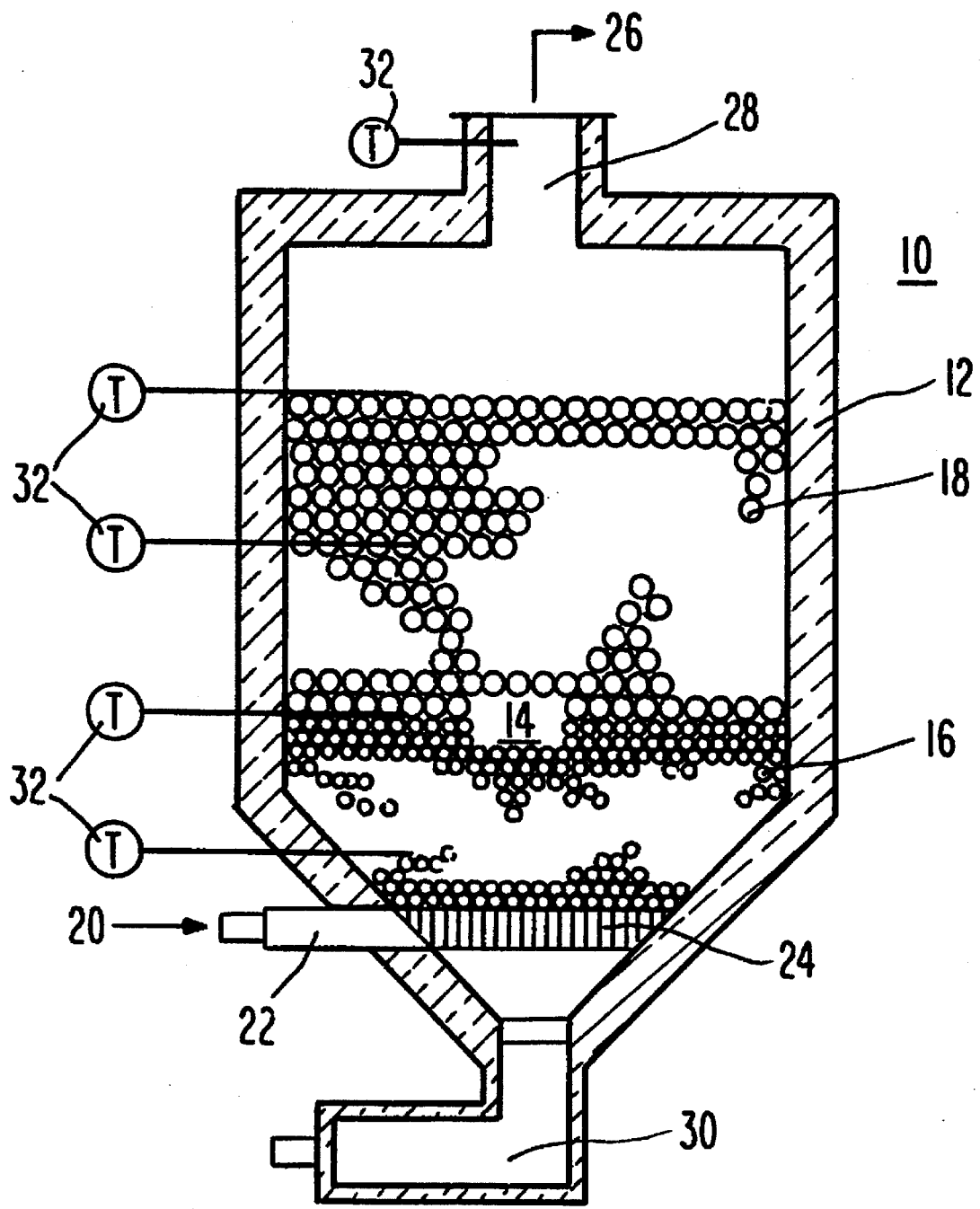
FIG. 1 is an embodiment of a flameless oxidizer as might be used in the process and apparatus of the present invention.

It has now been discovered that a combination of successfully demonstrated catalytic oxidizer technology with an innovative high performance flameless oxidation process results in an integrated VOC destruction unit offering operational simplicity, near zero emissions, and reduced costs. The proposed integrated VOC abatement system is designed to operate efficiently with gas stream containing VOC concentrations that vary over time, providing less expensive, yet superior and more reliable, performance as an alternative to incineration or strict catalytic oxidation. It will be understood that the application of the invention is similar for the clean up of VOC's from any spill or leak or from any other source of VOC's.

Significant research into the phenomena of oxidation within porous inert media ("PIM") has recently been undertaken. Because PIM oxidation can occur outside the normal premixed fueled/air flammability limits, the technology can be called "flameless". In this regard U.S. Pat. No. 4,688,495 (Galloway) U.S. Pat. No. 4,823,711 (Kroneberger et al.) disclose early work on matrix oxidation technology. In addition, U.S. Pat. No. 5,165,884 (Martin et al.) and U.S. Pat. No. 5,320,518 (Stilger et al.) discuss in significant detail the technology involved in a flameless oxidizer.

As a treatment technology, such a flameless oxidizer process exhibits most of the advantages of conventional or catalytic thermal combustion, while avoiding many of the disadvantages. Like flame-based thermal combustion, organics are oxidized to harmless product gases ($CO_2$, $H_2O$) or easily neutralized acid gases (HCl, $SO_2$). No waste or residues are created, and the process is suitable for a wide range of compounds or mixtures. Unlike thermal incineration, where the mixing and reaction are interdependent with the flame, these are decoupled in the inventive system, allowing greater flexibility and control, and the elimination of products of incomplete combustion ("PIC's").

The basis for the oxidation process is a "destruction matrix" that fosters the conditions necessary for stable, flameless oxidation of organic compounds, outside their respective flammability limits. The three primary attributes of the destruction matrix that permit flameless oxidation are its interstitial geometry (which enhances mixing), its thermal inertia (which promotes stability), and its surface characteristics (which augment heat transfer). The thermal properties of the matrix allow the mixing zone to be near ambient temperature where the fume enters while the flameless reaction zone, further downstream, is at the appropriate oxidation temperature.

These attributes lead to several performance- and safety-related advantages in practical applications. Among these are the ability to establish a stationary reaction zone (wherein the rate of fume oxidation is much faster than in the post-flame region of an incinerator); the ability to accommodate rapid process fluctuations (as with batch chemical reactor discharges); the capability for wide process turndown (for cost effective adaptation to changing conditions); the suppression of flashback (by virtue of the matrix's high surface area and heat absorption capability); and a high level of manageability and control (compared to a flame).

Turning in detail to the drawings, where like numbers designate like components, FIG. 1 illustrates an embodiment of one such flameless oxidizer as might be used in the process and overall apparatus of this invention, although it is not intended that all components are shown to scale. Typically, the flameless oxidizer (10) will consist of a suitable matrix bed containment shell (12) that is filled with a quantity of heat-resistant material creating a matrix bed (14). The types of matrix materials used should preferably have high heat conductance by radiation, convection, and conduction. The heat transfer properties of the system are dependent on the ratio of radiative to convective heat-transfer.

The matrix bed (14) may be sized for any desired flow stream by altering one or more of the matrix flow cross-section, height, material, void fraction, outlet temperature, and supplemental heat addition, if desired. Preferred matrix materials are ceramic balls or saddles, but other bed materials and configurations may be used, including, but not limited to, other random ceramic packings such as pall rings, structured ceramic packing, ceramic or metal foam, metal or ceramic wool and the like. Generally, the void fraction of the matrix bed will be between 0.3 and 0.9. In addition, the material in the matrix bed will typically have a specific surface area ranging from 40 $m^2/m^3$ to 1040 $m^2/m^3$.

In the preferred embodiment of FIG. 1, two types of heat-resistant material are used. In the lower portion of the flameless oxidizer (10), a bed of ceramic balls acts as a mixing zone (16). This mixing zone (16) would typically have an interstitial volume of about 40% and partially acts as the equivalent of a plenum. Above this bed of balls, a bed of ceramic saddles is utilized to create a reaction zone (18). This reaction zone (18) would typically have an interstitial volume of about 70%.

A preheater apparatus (30) is configured at the base of flameless oxidizer (10). This preheater (30) initially passes hot gas through the matrix bed (14) in order to preheat both the ceramic ball mixing zone (16) and the ceramic saddle reaction zone (18) to normal operating temperatures. In one alternative embodiment, heating elements (not shown), which are preferably electric, can surround this containment shell (12) to provide the system with preheating and proper temperature maintenance during operation. It is also possible to have the preheater as a separate unit upstream of the flameless oxidizer (10) that acts to heat gases that are then flowed through the flameless oxidizer (10) to heat the matrix bed (14).

The entire thermal oxidation assembly will sometimes, but not always, be designed so as to minimize heat loss to the environment, while ensuring that all exposed surfaces remain below those temperatures acceptable for a Class I, Division 2, Group D area. (The National Electrical Code categorizes locations by class, division, and group, depending upon the properties of the flammable vapors, liquids, or gases that may be present and the likelihood that a flammable or oxidizable concentration or quantity is present. The Code requires that the surface temperature of any exposed surfaces be below the ignition temperature of the relevant gas or vapor.)

Inlet gases (20) from an upstream VOC collection system enter the flameless oxidizer (10) through inlet (22). While shown in FIG. 1 entering through separate inlet (22), inlet gases (20) could enter through the same inlet as that used for preheater (30), thereby eliminating the need for a separate inlet (22). In addition, depending upon process conditions, and as needed to provide sufficient heat values so as to maintain a self-sufficient operating environment within the flameless oxidizer, additional air and/or natural gas or other fuel may be added to this inlet stream (20). (This will be discussed in more detail below with respect to the combined catalytic/PIM oxidizer.) There will typically, but not necessarily, be a plenum (24), preferably made of a heat-resistant material such as a perforated plate, at the bottom of the matrix bed (14) to prevent the heat-resistant material (16) from entering the piping below the matrix bed.

In the normal flow pattern, where the oxidizer input stream (20) enters the flameless oxidizer (10) near the bottom, this plenum (24) will also act to evenly distribute incoming gases and further mix these gases prior to entering the matrix bed (14). Nevertheless, while FIG. 1 indicates that the input stream (20) enters the flameless oxidizer (10) at the bottom and that the gaseous products (26) exit at the top, and this is the preferred embodiment, the present invention can be operated in an alternate configuration wherein the gases enter at the top and exit at the bottom.

Within the reactor vessel (10) during normal processing, the gas stream containing VOC's (20) first enters the mixing zone (16), which is at close to ambient temperature. After undergoing intimate mixing in the matrix interstices of the mixing zone (16), the reactant mixture enters the reaction zone (18) where oxidation and heat release occur. The inlet gases will be raised to oxidation temperatures of 1400°–3500° F. (760°–1925° C.), and preferably 1550°–1800° F (845°–980° C.). The gases are then maintained at these temperatures for a sufficient residence time to ensure substantially complete destruction of the VOC's. In normal operation, it is contemplated that this residence time will be less than 2.0 seconds, and preferably less than 0.2 seconds.

As the gases heat up, they expand, and this expansion is preferably accommodated by an increase in matrix void volume in reaction zone (18), such as through the use of ceramic saddles within the reaction zone versus ceramic balls within the mixing zone.

The result of this heating is the creation of a flameless oxidation zone within the matrix bed (14) whereby the VOC's are ignited and oxidized to stable products, such as water and carbon dioxide. The oxidation zone is observed as a steep increase in bed temperature from ambient temperature on the inlet side of the zone to approximately the adiabatic oxidation temperature of the mixture on the outlet side of the zone. This rapid change takes place over a distance of usually several inches in a typical oxidizer, with the actual distance being dependent upon feed concentrations, feed rates, gas velocity distribution, bed material, and bed physical properties, type of specific feed materials, etc. Heat losses in the direction of flow also will have an effect on the length of the oxidation zone. The rapidity of the change allows for use of a very compact reactor.

The temperature of the oxidation is dependent upon feed concentrations, feed rates, gas velocity distribution, bed physical properties, type of specific feed materials, heat losses, heat input from the heaters, etc.

By decoupling the mixing from the oxidation, one of three critical parameters (turbulence, the others being time and temperature) is removed from the design equation. Accomplishing the mixing prior to the reaction achieves two beneficial results. First, thorough mixing of the fume and air is ensured, negating the possibility of poorly mixed parcels leaving the system unreacted. Second, the uniformity of the reactant stream also helps to establish the uniformity of the reaction zone. Together, these factors allow the processing rate to be turned up or down, without regard to fluid mechanics constraints, over a much wider range.

After thorough destruction in the flameless oxidizer (10), the product gases (26) then leave the reactor through port (28).

Thus, the basics of the preferred embodiments of the flameless oxidizer for use in the present invention have been disclosed. Many variations on, and additions to, these basic embodiments are also possible.

The existence of a uniform, intramatrix reaction zone perpendicular to the flow axis is the fundamental condition of this flameless oxidation process. In the zone, the reactant gases are efficiently preheated up to the oxidation temperature by the hot matrix surface, whereupon they are oxidized exothermally. They quickly release their heat back to the matrix, to maintain its local temperature. The unique heat transfer properties of the matrix bed (14) are what allows this stable reaction to occur at organic concentrations well below the lower flammability limit of the constituents.

The reaction zone covers the entire flow cross-section of the flameless oxidizer (10), ensuring that all reactants pass through this highly reactive region. The presence of a large pool of active radicals (H, OH, etc.) in this domain allows the oxidation reactions to occur at rates up to two orders of magnitude faster than the simple thermal decomposition reactions that occur in the post-flame region of a conventional incinerator or thermal oxidizer. Since the inventive process takes advantage of the active radical chemistry (e.g., $C_mH_n+O=C_mH_{n-1}+OH$) that is characteristic of combustion chain reactions, the reaction time required to destroy the vast majority of organic molecules is less than 0.1 seconds. This runs counter to the conventional incineration process with the majority of organic molecules being destroyed in the "post-flame" region, where the population of active radicals is low, and slower thermal decomposition reactions (e.g., $C_mH_n+M=C_mH_{n-1}+H+M$) govern the chemistry.

These exceptionally fast kinetics eliminate the need for additional residence time, because the reactions proceed to completeness in tens of milliseconds. Therefore, in order to assure high destruction efficiencies, design capacity flow rate and related cross-sectional area requirements, determined by the temperatures and kinetics, rather than residence time, will be the appropriate constraint in such a flameless oxidizer. Because maximum flow is determined by device geometry and reaction zone properties, this constraint is device dependent, and not generic, as is residence time for flame-based technologies.

Furthermore, the existence of a uniform reaction zone minimizes the formation of PICs, which are most commonly formed in the post-flame region of an incinerator, where the organic fragments are more likely to combine with each other than they would if the radical population was higher.

The uniform reaction zone also eliminates the regions of very high temperatures as well as the step temperature gradients that exist in a flamed device. The flameless oxidizer's ability to control the maximum reaction temperature to be equivalent to the average reaction temperature, virtually eliminates the formation of thermal $NO_x$ and CO. In a typical flameless oxidizer system of the type to be used in a combination system in accordance with the present invention, the DRE of the organic vapors has been shown to be greater than 99.99%. Because the flameless oxidizer typically operates at temperatures (1550°–1850° F.) significantly below those present in standard combustors (about 3500° F.), there is less production of the undesirable $NO_x$ by-products. Typical $NO_x$ concentrations in the outlet stream are less than 2 ppmv and CO is generally undetectable.

Extensive testing of this technology has been undertaken in determining the DRE attainable in the treatment of various hydrocarbons and kalogenated hydrocarbons. These test results are summarized in Table 1.

TABLE 1

Summary of Test Conditions and Results — Volatile Organic Compound Destruction

| Compounds | Lowest Inlet Concen. (ppmv) | Highest Inlet Concen. (ppmv) | Minimum % DRE* |
|---|---|---|---|
| Benzene | 1,719 | 8,406 | 99.99 |
| Carbon Tetrachloride | 0.67 weight | 1.15% weight | 99.99 |
| Dichloro-methane | 5,000 | 18,000 | 99.99 |
| Isopropanol | 400 | 600 | 99.99 |
| Methyl Chloride | 10,000 | 30,000 | 99.99 |
| Monomethyl-amine | 16,000 | 31,000 | 99.99 |
| Paint Solvent Mixture | 3.87 mg/liter | 5.32 mg/liter | 99.99 |

*Note: Detection Level Limited

The flameless oxidation process itself is inherently energy efficient. If the fume fed to the flameless oxidizer contains sufficient organics (enthalpy content approximately 30 BTU/scf or more), the reaction can be self-sustaining, and no supplementary fuel or heat is required within the oxidizer itself. This behavior is contrary to the operation of a flame-based oxidizer, where the main flame is fueled exclusively by a clean, stable fuel source such as natural gas, regardless of the fume enthalpy content.

The process is typically controlled by simple temperature control. Temperature elements (32) as shown in FIG. 1, can be connected to a programmable control system (not shown in FIG. 1 but described below with respect to FIG. 2) to regulate the flow of supplementary fuel or air in the respective cases of lean or rich fume streams.

The flameless oxidizer reactor vessel is normally insulated for personnel safety and heat retention. The matrix also acts as a heat sink, to buffer possible fluctuations in fume flow, concentration, and composition. During the delay period after a spike or step change in flow or concentration begins to affect the matrix temperature, the supervisory control system is able to take the appropriate corrective action (adding supplementary fuel or air) to maintain temperature.

The heat capacity and geometry of the matrix also provide an important safety benefit—an inherent flame arresting capability. In the event that a flammable mixture enters the reactor, the cold (mixing) region (16) of the matrix bed (14) would prevent the backward propagation of a flame upstream.

Furthermore, the matrix interstices provide both the high quench surface area and tortuous pathways for flow interruption that are intrinsic to commercial flame arrestors.

The types of materials in the matrix bed (14) may be varied so that the inner body heat transfer characteristics, the radiative characteristics, the forced convective characteristics, and the inner matrix solids thermally conductive characteristics may be controlled within the bed. This may be done by varying the radiative heat transfer characteristics of the matrix bed (14) by using different sizes of heat-resistant materials (16, 18) to change the mean free radiative path or varying the emissivity of these materials, varying the forced convection heat transfer characteristics of the matrix bed (14) by varying its surface area per unit volume, or geometry, varying the thermally conductive heat transfer characteristics of the matrix bed (14) by using heat-resistant materials (16, 18) with different thermal conductivities, or changing the point to point surface contact area of the materials in the bed. These properties may be varied either concurrently or discretely to achieve a desired effect.

In addition to changing the properties of the matrix bed (14) itself, an interface, or several interfaces, can be introduced into the bed where one or more of the heat transfer properties of the bed are discretely or concurrently changed on either side of the interface and wherein this variation serves to help stabilize the reaction zone in that location and acts as an "oxidation zone anchor." This may be done, for example, by introducing an interface where void fractions change across the interface within the matrix bed (14), such as is represented in FIG. 1 by mixing zone (16) and reaction zone (18). The interface may change the mean free radiative path across the interface independent of the void fraction. By changing heat-resistant materials, the emissivity may change across the interface within the matrix bed. Changing the area per unit volume of the heat-resistant materials across an interface, the forced convective heat transfer characteristics may change as the gas is passed across the interface.

The matrix bed cross-section perpendicular to the flow axis may be configured in a circular, square, rectangular, or other geometry. The area of the cross-section may be intentionally varied (i.e., as a truncated cone or truncated pyramid) to achieve a wide, stable range of reactant volumetric flow rates at each given matrix burning velocity.

Figure 2:
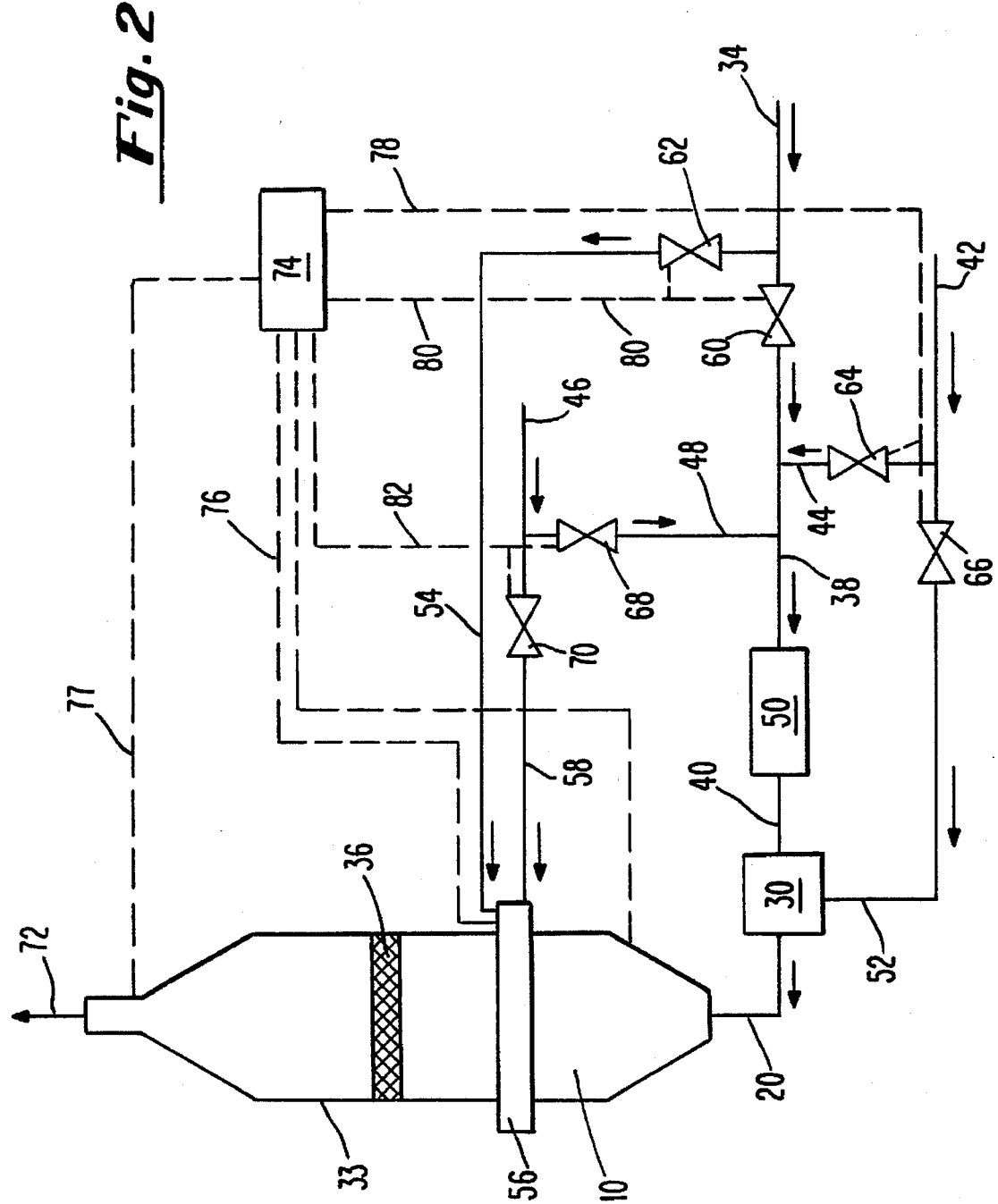
FIG. 2 is a flow diagram detailing one embodiment of an apparatus of the present invention.

Turning now to the integration of this flameless oxidizer technology within an overall system of VOC destruction for use where the volatiles stream has a concentration that varies over time, one embodiment of the present invention is shown in schematic form in FIG. 2.

In this embodiment, a flameless, non-catalytic oxidizer (10) is constructed in an integral relationship with a catalytic oxidizer (36) such that the exhaust from the flameless oxidizer (10) will necessarily flow through the catalytic oxidizer (36) via a connecting cylinder or other direct connection (56). This combination noncatalytic/catalytic oxidizer (33) is also configured to allow for the addition of gas streams to the flow through the combination oxidizer (33) at a point between the flameless oxidizer (10) and the catalytic oxidizer (36), as will be further discussed below.

The schematic of FIG. 2 is not intended to represent a scale depiction of the various components of the combination oxidizer (33). It is also possible to have any variety of cross-sectional shapes for the flameless oxidizer&r (10), the connection (56), and the catalytic oxidizer (36), although a generally cylindrical design will typically be the most efficient.

The present inventive apparatus is somewhat similar in design to a conventional catalytic oxidizer in having a fume introduction for the inlet gases (20) and an amount of oxidative catalyst (36). In contrast to a normal catalytic oxidizer, however, the present invention does not utilize a diffusion burner pilot. Instead, a PIM oxidizer (10) of the type discussed above is used. Furthermore, the system controls for the present invention are completely different than the typical diffusion flame oxidizer or catalytic oxidizer.

In the shown configuration of the apparatus of the present invention, the gas stream containing VOC's (34) can be fed directly to the flameless oxidizer (10) via the combination of lines (38), (40), and (20). In addition, a source of supplemental fuel (42) can also be fed to the flameless oxidizer (10), in this case using the combination of lines (44), (38), (40), and (20). Finally, a source of supplemental air (46) can be fed to the flameless oxidizer (10) via the combination of lines (46), (48), (38), (40), and (20).

A mixer (50) is provided such that any combination of flows from the gas stream containing VOCs (34), the source of supplemental fuel (42), and the source of air (46) will be thoroughly mixed prior to entering the flameless oxidizer (10).

In the embodiment of FIG. 2, preheater (30) is illustrated as a separate unit upstream of flameless oxidizer (10). As illustrated, this preheater (30) can generate hot gases utilizing supplemental fuel provided via fuel line (52). These hot gases can be used to initially heat the matrix bed (14) up to, and above, the autoignition temperature of the VOC's to be destroyed.

Additionally, the gas stream containing VOC's (34) can alternatively be delivered to a point downstream of flameless oxidizer (10) but upstream of the catalyst (36) using bypass conduit (54). As is illustrated, any such bypass gas stream would be combined into the flow stream of the combination non-catalytic/catalytic oxidizer (33) at a point just upstream of the catalytic oxidizer (36). Any bypass stream would preferably be added at several points around the circumference of the combination oxidizer (33) through an inter-oxidizer plenum (56). Typically, this inter-oxidizer plenum (56) would simply be a series of ports located circumferentially around the outside of combination oxidizer (33). Such circumferential injection ensures maximum mixing of the bypass stream with any gas flow from the flameless oxidizer (10) portion of the combination oxidizer (33).

In a similar fashion, air can be delivered to the inter-oxidizer plenum (56) via line (58) and, thereby, be added to the flow stream in the combination non-catalytic/catalytic oxidizer (33) upstream of the catalyst (36).

Valves (60) and (62) allow for the selective delivery of the gas stream containing VOC's (34) either upstream or downstream of the flameless oxidizer (10). Valves (64) and (66) allow for selective delivery of supplemental fuel to the preheater (30) or to the inlet stream (20) to the flameless oxidizer (10). Finally, valves (68) and (70) allow for selective delivery of air (46) either upstream or downstream of the flameless oxidizer (10).

The exhaust flow from the combination oxidizer (33) exits the combination oxidizer (33) via exhaust line (72).

One preferred embodiment of the present invention, as shown in FIG. 2, utilizes an overall system controller (74). This controller (74) preferably works in conjunction with a temperature sensor (76) that measures the temperature of the system gas flow as it exits the flameless oxidizer (10) and before it enters the catalytic oxidizer (36). Other temperature sensors (75) and (77) measure the temperature of the system gas flow within the flameless oxidizer (10) and as it exits the catalytic oxidizer (36), and are also connected to the controller (74). In addition, system controller (74) monitors and controls the flow rate through the various valves, using control line (78) to monitor and control supplemental fuel valves (64) and (66), control line (80) to monitor and control gas stream valves (60) and (62), and control line (82) to monitor and control air valves (68) and (70). During operation, system controller (74) utilizes the temperature sensed by temperature sensor (76) as well as the monitored flow rates through valves (60), (62), (64), (66), (68), and (70) to selectively determine which valves should be opened and to what extent. Through appropriate calculation, system controller (74) can combine temperature data from temperature sensor (76) and gas flow rate data through the various valves to determine the inherent BTU value of gas stream (34).

While a single system controller (74) has been described, it would be obvious to those of skill in the art that several different controllers could be used to control various aspects of the present system, either automatically or manually without departing from the spirit of the present invention.

To describe further the components of one preferred embodiment of the present inventive apparatus, a preferred process of system operation operating on a gas stream initially containing high VOC concentrations will now be described.

During system start-up, supplemental fuel is fed through valve (66) and fuel line (52) along with air through valve (68) and the combination of lines (48), (38), and (40) to preheater (30) where the fuel is combusted to produce hot gases, which are then fed through the flameless oxidizer (10) via inlet line (20). The hot gases preheat the matrix bed of heat resistant material. Once the matrix bed (14) has been preheated to a temperature exceeding the autoignition temperature of the VOC streams to be oxidized (a temperature normally in the range of 1400° F. (760° C.) to about 3500° F. (1925° C.), valve (66) is closed and valve (60) is opened. (Valve (68) may be closed or may remain partially opened, depending upon the profile of the incoming gas stream, as is discussed below.) The opening of valve (60) allows the high VOC concentration gas stream (34) to pass through mixer (50) and preheater (30) into flameless oxidizer (10).

A preferred embodiment of the flameless oxidizer (10) will operate optimally when the gas that is fed to it has an inherent BTU value of approximately 30–35 BTU/scf. As preferably designed, gases with such a BTU value will allow for the establishment of a steady, flameless reaction zone within the matrix bed (14) of flameless oxidizer (10).

Flameless oxidizers of the type described can typically operate over a wide range of gas flow rates provided that the gas generally contains 30–35 BTU/scf. It is not unusual for such a flameless oxidizer to have a turn-down ratio of 20 to 1, i.e., the oxidizers can be designed to handle flow rates that vary by a factor of 20 (for example, from 1000 scfm down to 50 scfm).

Not uncommonly, the VOC concentration of gas stream (34) will initially be higher than the concentration that would provide an inherent BTU value of 30–35 BTU/scf. In such cases, temperature sensor (76) will detect increasing and/or unstable temperatures in the gaseous products exhaust (26) from flameless oxidizer (10). System controller (74) will act to correct this situation by opening valve (68) to allow diluting air into the system upstream of flameless oxidizer (10) via line (48). This air will combine with the gas stream in line (38) and the two will thereafter be thoroughly mixed in mixer (50). Sufficient diluting air is added to lower the inherent BTU value of the combined air-gas stream into the 30–35 BTU/scf range.

In a typical process such as SVE, the VOC concentration of the gas stream (34) will gradually decrease over time. As the VOC concentration lowers and the inherent BTU value of the gas stream (34) moves closer to the preferred 30–35 BTU/scf range, the amount of diluting air needed and introduced through valve (68) will decrease. Once the gas stream's inherent BTU value in and of itself reaches the 30–35 BTU/scf range, no further diluting air will be needed and valve (68) will be closed.

Thereafter, as the VOC concentration of gas stream (34) continues to decrease, it becomes necessary to supplement the inherent BTU value through the addition of supplemental fuel. Natural gas has an inherent BTU value of approximately 1,000 BTU/scf and, thus, can be used in comparatively small amounts to raise overall BTU values. To accomplish this, system controller (74) gradually opens supplemental fuel valve (64) to introduce supplemental fuel in line (44). This fuel is combined with gas stream (34) in line (38) and mixer (50) prior to entry into the flameless oxidizer (10).

While system controller (74) has as a principle function determining the inherent BTU value of gas stream (34) and regulating the flows of supplemental fuel and/or air upstream of the flameless oxidizer (10), it also serves an additional function relating to the catalyst (36). Because the catalyst (36) will be thermally deactivated if the gases passing through it are either overheated initially or contain too much inherent BTU value, it is critical to regulate the inherent BTU value and temperature of the gases introduced to the catalytic oxidizer (36). The final temperature of the gases exiting the catalyst must remain below the temperature at which the catalyst (36) will become sintered. Consequently, system controller (74), by monitoring temperatures and flow rates, determines whether or not, and how much, diluting air should be combined with the gaseous products (26) from the flameless oxidizer (10) in order to protect the catalytic oxidizer (36) from abnormal catalyst damage. System controller (74) will open air valve (70) as appropriate to deliver air to the inter-oxidizer plenum (56) via line (58) to reduce both the temperature and the BTU value of the gas flow.

During periods when the entirety of gas stream (34) is delivered to the flameless oxidizer (10), catalytic oxidizer (36) will perform little function in the way of oxidizing harmful emissions because of the completeness of oxidation occurring in the flameless oxidizer (10). Nevertheless, it is preferable to control the relative combination amounts of gaseous products (26) and diluting air (70) such that the temperature of the combined stream will maintain the catalyst bed (36) at its preferred operating temperature. Many catalytic oxidizers operate with exhaust temperatures of 600°-800° F. (315°-425° C.). Because the exhaust temperature should be maintained so as not to exceed this normal 600°-800° F. (315°-425° C.) temperature, any gas stream that is fed to the catalytic oxidizer (36) will have to be fed at an even lower temperature since the oxidizer process itself generates heat.

If possible, based on the inherent BTU value, it is preferred to employ the catalytic oxidizer (36) for processing the VOC's. The principal reason for this is that lower operating temperatures are needed, thereby saving energy overall.

When the inherent BTU value of gas stream (34) decreases to approximately 5 BTU/scf or lower, the gas stream (34) can be viably processed through the catalytic oxidizer (36). At this point, at least most of gas stream (34) will be by-passed around the flameless oxidizer (10) directly to catalytic oxidizer (36). Valve (62) will be open while valve (60) will be mostly, if not totally, closed.

While from a normal processing standpoint it would be preferable to process any gas stream containing 5 BTU/scf or less directly through the catalytic oxidizer (36), for overall system efficiency and to ensure maintenance of proper operating temperatures within the catalytic oxidizer (36), it is preferable in the present inventive process to continue to operate flameless oxidizer (10) at minimum flow rates. Thus, controller (74) preferably controls valves (60) and (64) to create a combination gas/supplemental fuel stream that flows at the minimum volume possible for proper operation of flameless oxidizer (10) and that also contains the preferred 30-35 BTU/scf. Because of the very high BTU value of natural gas, it will have to be combined with a diluting stream either of fumes at a lower BTU value or diluting air or oxygen. The remainder of the gas stream (34) is by-passed through valve (62) to the inter-oxidizer plenum (56).

While this is the preferred embodiment, it is also possible to feed a supplemental fuel/air combination stream through the flameless oxidizer (10) while by-passing all of gas stream (34) to the catalytic oxidizer (36). This variation, however, is not as efficient since more supplemental fuel will be required to create the appropriate 30-35 BTU/scf stream for the flameless oxidizer (10).

Due to the desirability of maintaining a minimum flow through the flameless oxidizer (10) at all times, it is possible that dilution air will need to be added in the inter-oxidizer plenum (56) so that the combination of gaseous products (26), gas stream (54), and dilution air (58) will have the appropriate BTU value/temperature to avoid harm to the catalytic oxidizer (36).

Overall, during normal operation, should the VOC concentration of gas stream (35) either decrease or increase, the system controller (74) would react to reconfigure the system for the most efficient destruction of VOC's.

One key consideration for the most efficient operation of the present invention is to ensure that both the streams entering the flameless oxidizer (10) and those entering the catalytic oxidizer (36) are thoroughly mixed prior to entry. For example, if dilution air is being added to the gaseous products (26) from flameless oxidizer (10) in order to avoid overheating of the catalytic oxidizer (36), it is imperative to have good mixing of the dilution air with the hot gaseous products (26) so that there are no localized hot spots that could lead to catalyst damage. For this reason, it is preferable to inject or otherwise add any dilution air or bypass gas streams at a plurality of points around the circumference of the connection between the flameless oxidizer (10) and the catalytic oxidizer (36).

While one preferred embodiment of the present inventive apparatus and process has been described, there are many other variations that are contemplated to be within the scope of the present invention. For example, it would be possible to configure the system such that heat from the exhaust stream (72) is recovered for use in preheating the inlet gases (20) to the flameless oxidizer (10). It should be noted, however, that if gas stream (34) has a BTU value exceeding the preferred 30-35 BTU/scf, there is no reason to try to recover heat from the exhaust for use in the present system (although it can always be used for heating other, not-here-described systems). On the other hand, when the gas stream (34) has BTU values between 5 and 30 BTU/scf, or substantially below 5 BTU/scf, it is potentially useful to recover heat from the exhaust stream (72). (Apart from use within the described system, recovered heat can be used in other systems such as heat recovery boilers or in thermal desorption processes.)

The present invention has significant advantages over existing systems, and even over combinations of existing systems. As discussed above, catalytic beds often use pilot flames to maintain appropriate temperatures. Such pilot flames are necessary because of the very short residence times involved in using small catalyst sections for large systems. Since catalytic beds are usually very small due to the expense of the catalytic material, and because fume values vary, it is very hard to achieve a steady state, self-regulating temperature within the catalytic bed itself without use of an outside heat source such as a pilot flame. It is also difficult to achieve self-sustaining reactions in a catalyst bed, because the maximum use temperature of the bed it too low to provide enough feedback of heat (both radiatively and conductively along the catalyst substrate) to cause the leading edge of the catalyst to exist above the "light-off" temperature (typically not less than 400° F.) at normal fume gas flow velocities. The present invention, however, eliminates the need for such pilot flame by using the flameless oxidizer (10) as a regulating heat source for the catalytic oxidizer (36).

Further, it would be significantly less efficient to utilize the general configuration of the present invention while substituting a flamed combuster for the flameless oxidizer (10). This is because most flamed combusters require inherent BTU values of 200–250 BTUs/scf. (In fact, certain states require that flamed combusters meet these standards.) Since catalytic oxidizers normally only can tolerate on the order of 5 BTU/scf, use of a flamed combuster in the general configuration of the present system would require adding supplemental fuel across the entire range of VOC concentrations from the 200–250 BTU/scf range down to the 5 BTU/scf range.

By contrast, the herein-described PIM technology is the only technology known to date that can thermally operate in the presently described, two-step process over the VOC concentration range from 200 BTU/scf down to 30 BTU/scf. Because of this, and because the two-step system is integrated rather than operating as two separate systems switching between one and the other, the present inventive system will have lower operating costs. Furthermore, use of the present invention will result in exhausts having lower thermal $NO_x$ production, with no more than two parts per million on a volume basis.

The present combination non-catalytic/catalytic oxidizer system overcomes the need for excessive amounts of dilution air called for by catalytic oxidizers when operating with high VOC concentration streams while, at the same time, overcoming the need for excessive amounts of supplemental fuel called for when running a flame-based thermal oxidizer to destruct low VOC concentration streams.

While the present invention is particularly useful with soil remediation systems where the VOC concentration will start at a comparatively high level and gradually decrease over time, it can also be readily used with any system having large changes in VOC concentration over time. For example, certain batch processes (such as in acrylic manufacturing) move from a rich VOC stream to a lean VOC stream over the course of a 24 hour or longer period.

Finally the present inventive configuration offers another major advantage in that the treatment process is not classified as an incinerator. This greatly facilitates permitting. It can be shown that the integrated processing system is sealable to an economical throughput capacity with system performance and operational reliability exceeding that of an incineration system at lower unit operating costs.

In summary, apparatuses and methods for destroying hazardous organics from in situ soil and other sources of varying VOC concentration using a combination flameless oxidation system have been described.

The present invention has been described in terms of several preferred embodiments. However, the invention is not limited to the embodiments depicted and described, but can have many variations within the spirit of the invention. For example, while a fuel-fired preheater has been shown and described, it would be obvious to one skilled in the art that other standard preheating devices can be utilized within the framework of the present invention.

Accordingly, the scope of the invention should be determined not by the embodiments illustrated, but rather by the appended claims and their legal equivalents. Having thus described the invention, what is desired to be protected by Letters Patent is presented by the following appended claims.

What is claimed is:

1. An apparatus for destruction of volatile organic compounds comprising:
   a source of one or more gas streams having uncontrolled volatile organic compound content;
   a flameless, non-catalytic oxidizer having:
   (a) an inlet port in flow communication with the gas stream source;
   (b) an outlet port; and
   (c) a section located between the inlet port and the outlet port including a matrix bed of non-catalytic, heat-resistant material comprising an upstream side in flow communication with the inlet port and a downstream side in flow communication with the outlet port;
   a catalytic oxidizer containing catalyst and having an inlet and an outlet;
   a connection between the outlet port of the flameless, non-catalytic oxidizer and the inlet of the catalytic oxidizer such that the downstream side of the matrix bed is in flow communication with the catalytic oxidizer;
   means for selectively adding supplemental fuel and air to the flow on the upstream side of the matrix bed;
   means for selectively adding air to the flow in the connection;
   a bypass conduit directly connecting the connection to the gas stream source such that the one or more gas streams are in direct flow communication with the inlet of the catalytic oxidizer; and
   a control system for selectively controlling the amount of the one or more gas streams delivered to the flameless, non-catalytic oxidizer and the amount diverted through the bypass conduit directly to the catalytic oxidizer.

2. The apparatus of claim 1 wherein the control system selectively delivers portions of the one or more gas streams to the flameless, non-catalytic oxidizer or directly to the catalytic oxidizer depending upon the concentration of VOC's in the one or more gas streams.

3. The apparatus of claim 1 wherein the matrix bed is constructed such that it can thermally destroy volatilized contaminants without use or creation of a flame.

4. The apparatus of claim 1 further comprising control means that controls the amount of supplemental fuel and air added to the flow on the upstream side of the matrix bed so that the temperature within the hottest portion of the matrix bed is maintained between about 1400° F. (760° C.) and about 3500° F. (1925° C.).

5. The apparatus of claim 1 further comprising control means that controls the amount of air added to the flow in the connection so that the temperature at the outlet of the catalytic oxidizer is maintained below the thermal deactivation temperature of the catalyst.

6. The apparatus of claim 1 wherein the control system selectively delivers a portion of the one or more gas streams to the flameless, non-catalytic oxidizer or directly to the catalytic oxidizer in response to temperatures sensed within the matrix bed or the connection by one or more temperature sensors.

7. The apparatus of claim 1 wherein the heat-resistant material comprises ceramic balls, ceramic saddles, ceramic pall rings, ceramic rashig rings, ceramic foam, ceramic wool, metal foam or metal wool.

8. The apparatus of claim 1 wherein the matrix bed comprises at least two layers of heat-resistant material wherein the layers are comprised of differently sized heat-resistant material and wherein the section of the flameless oxidizer is configured to create a flow pattern from the inlet to the outlet that causes any flow to pass through the layer of smaller sized materials first.

9. The apparatus of claim 1 wherein the matrix bed has a void fraction from 0.3 to 0.9.

10. The apparatus of claim 1 wherein the material in the matrix bed has a specific surface area of from 40 $m^2/m^3$ to 1040 $m^2/m^3$.

11. The apparatus of claim 1 further comprising a pre-heater capable of preheating the matrix bed to a temperature above the autoignition temperature of the volatile organic compound in the one or more gas streams.

12. The apparatus of claim 1 wherein the flameless, non-catalytic oxidizer further comprises a plenum located between the inlet port and the matrix bed.

13. The apparatus of claim 1 further comprising a plenum means for mixing any air added to the flow in the connection and any gas flow from the downstream side of the matrix bed prior to the entry of such flows into the catalytic oxidizer.

14. The apparatus of claim 1 wherein the bypass conduit for the one or more gas streams and means for selectively adding air to the flow in the connection are configured to add such gas streams and air at a plurality of points around the circumference of the connection prior to the entry of such flows into the catalytic oxidizer.

15. An apparatus comprising:
  a gas stream containing volatile organic compound;
  a flameless, non-catalytic oxidizer having a gas inlet port in flow communication with the gas stream, a gas outlet port, and a matrix bed of non-catalytic, heat-resistant material located between the inlet port and the outlet port and comprising an upstream side in flow communication with the inlet port and a downstream side in flow communication with the outlet port;
  a catalytic oxidizer having an inlet and an outlet wherein the inlet is in flow communication with the downstream side of the matrix bed through a connection;
  means for selectively adding fuel and air to the flow on the upstream side of the matrix bed;
  means for selectively adding air to the flow between the downstream side of the matrix bed and the inlet to the catalytic oxidizer;
  a bypass conduit providing direct flow communication between the gas stream and the inlet of the catalytic oxidizer; and
  a control system controlling each of the amount of the gas stream delivered to the flameless, non-catalytic oxidizer, the amount of the gas stream diverted through the bypass conduit directly to the catalytic oxidizer, the amount of fuel or air added to the flow on the upstream side of the matrix bed, and the amount of air added to the flow between the downstream side of the matrix bed and the inlet to the catalytic oxidizer.

16. The apparatus of claim 15 wherein the control system selectively delivers some or all of the gas stream to the flameless, non-catalytic oxidizer or directly to the catalytic oxidizer depending upon the concentration of volatile organic compounds in the gas stream.

17. The apparatus of claim 16 wherein the control system is configured to determine the concentration of volatile organic compound in the gas stream using temperatures sensed within the matrix bed or connection by one or more temperature sensors.

18. The apparatus of claim 15 wherein the matrix bed is constructed such that it can thermally destroy volatilized contaminants without use or creation of a flame.

19. The apparatus of claim 15 wherein the control system controls the amount of fuel and air added to the flow on the upstream side of the matrix bed to maintain the temperature within the hottest portion of the matrix bed between about 1400° F. (760° C.) and about 3500° F. (1925° C.).

20. The apparatus of claim 15 wherein the control system controls the amount of air added to the flow between the downstream side of the matrix bed and the inlet to the catalytic oxidizer to maintain the temperature at the outlet of the catalytic oxidizer below the thermal deactivation temperature of the catalyst.

21. The apparatus of claim 15 wherein the heat-resistant material comprises ceramic balls, ceramic saddles, ceramic pall rings, ceramic rashig rings, ceramic foam, ceramic wool, metal foam, or metal wool.

22. The apparatus of claim 15 further comprising a plenum means for mixing any air added to the flow in the connection and any gas flow from the downstream side of the matrix bed prior to the entry of such flows into the catalytic oxidizer.

23. The apparatus of claim 15 wherein the bypass conduit and means for selectively adding air to the flow between the downstream side of the matrix bed and the inlet to the catalytic oxidizer are attached in flow communication with the connection through a plurality of injection points around the circumference of the connection.

24. An apparatus for destruction of volatile organic compounds comprising:
  a source of one or more gas streams having uncontrolled volatile organic compound content;
  a flameless, non-catalytic oxidizer having:
    (a) an inlet port in flow communication with the gas stream source;
    (b) an outlet port; and
    (c) a section located between the inlet port and the outlet port including a matrix bed of non-catalytic, heat-resistant material comprising an upstream side in flow communication with the inlet port and a downstream side in flow communication with the outlet port;
  a catalytic oxidizer containing catalyst and having an inlet and an outlet;
  a connection between the outlet port of the flameless, non-catalytic oxidizer and the inlet of the catalytic oxidizer such that the downstream side of the matrix bed is in flow communication with the catalytic oxidizer;
  a preheater capable of preheating the matrix bed to a temperature above the autoignition temperature of the volatile organic compounds in the one or more gas streams;
  means for selectively adding supplemental fuel and air to the flow on the upstream side of the matrix bed;
  means for selectively adding air to the flow in the connection;

a control means that controls the amount of supplemental fuel and air added to the flow on the upstream side of the matrix bed so that the temperature within the hottest portion of the matrix bed is maintained between about 1400° F. (760° C.) and about 3500° F. (1925° C.);

a second control means that controls the amount of air added to the flow in the connection so that the temperature at the outlet of the catalytic oxidizer is maintained below the thermal, deactivation temperature of the catalyst;

a bypass conduit directly connecting the connection to the source of one or more gas streams such that the one or more gas streams are in direct flow communication with the inlet of the catalytic oxidizer wherein the bypass conduit and the means for selectively adding air to the low in the connection are configured to inject any gas streams and air at a plurality of points around the circumference of the connection prior to the entry of such flows into the catalytic oxidizer; and a control system for selectively controlling the amount of the one or more gas streams delivered to the flameless, non-catalytic oxidizer and the amount diverted through the bypass conduit directly to the catalytic oxidizer, wherein the control system selectively delivers the one or more gas streams depending upon the concentration of VOC's in the one or more gas streams as determined from temperatures sensed within the matrix bed or connection by one or more temperature sensors.

* * * * *